United States Patent
Grzechnik (10) Patent No.: US 9,342,886 B2
(45) Date of Patent: May 17, 2016

(54) DEVICES, METHODS, AND APPARATUSES FOR HOMOGRAPHY EVALUATION INVOLVING A MOBILE DEVICE

(75) Inventor: Slawomir K. Grzechnik, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 287 days.

(21) Appl. No.: 13/453,812

(22) Filed: Apr. 23, 2012

(65) Prior Publication Data
US 2012/0301011 A1 Nov. 29, 2012

Related U.S. Application Data

(60) Provisional application No. 61/480,609, filed on Apr. 29, 2011.

(51) Int. Cl.
G06K 9/00 (2006.01)
G06T 7/00 (2006.01)
G06T 19/00 (2011.01)

(52) U.S. Cl.
CPC .............. *G06T 7/0044* (2013.01); *G06T 19/006* (2013.01); *G06T 2207/10016* (2013.01)

(58) Field of Classification Search
None
See application file for complete search history.

(56) References Cited

U.S. PATENT DOCUMENTS

| | | | | |
|---|---|---|---|---|
| 6,133,943 | A * | 10/2000 | Needham | 348/37 |
| 2002/0158873 | A1* | 10/2002 | Williamson | G06T 7/002 345/427 |
| 2003/0179923 | A1* | 9/2003 | Xiong et al. | 382/154 |
| 2008/0253656 | A1* | 10/2008 | Schwartzberg | G06K 9/3258 382/181 |
| 2009/0022369 | A1* | 1/2009 | Satoh | G01B 21/04 382/106 |
| 2010/0045701 | A1 | 2/2010 | Scott et al. | |
| 2010/0183229 | A1 | 7/2010 | Ruzon et al. | |
| 2010/0232727 | A1 | 9/2010 | Engedal | |
| 2010/0310182 | A1 | 12/2010 | Kroepfl et al. | |

FOREIGN PATENT DOCUMENTS

| | | |
|---|---|---|
| EP | 2045774 A1 | 4/2009 |
| WO | 2011048497 A2 | 4/2011 |

OTHER PUBLICATIONS

Alpert, N.M. et al. "The Principal Axes Transformation—A Method for Image Registration," Journal of Nuclear Medicine, Oct. 31, 1990, 7 pages.*

Ozuysal, Mustafa et al. "Fast Keypoint Recognition Using Ferns," IEEE Transactions on Pattern Analysis and Machine Intelligence, vol. 32, No. 3, Mar. 2010, 14 pages.*

(Continued)

*Primary Examiner* — Sumati Lefkowitz
*Assistant Examiner* — Ryan P Potts
(74) *Attorney, Agent, or Firm* — Berkeley Law & Technology Group, LLP (57) ABSTRACT

Components, methods, and apparatuses are provided that may be used to access information pertaining to a two-dimensional image of a three-dimensional object, to detect homography between said image of said three-dimensional object captured in said two-dimensional image indicative of said three-dimensional object and a reference object image and to determine whether said homography indicates pose suitable for image augmentation based, at least in part, on characteristics of an elliptically-shaped area that encompasses at least some of a plurality of inliers distributed in said two-dimensional image.

25 Claims, 4 Drawing Sheets

(56) References Cited

OTHER PUBLICATIONS

Pritchett, Philip et al. "Matching and Reconstruction from Widely Separated Views," Proceedings of European Workshop, 3D Structure from Multiple Images of Large-Scale Environments, Jun. 1998, 22 pages.*

Lepetit, Vincent, et al. "Fully automated and stable registration for augmented reality applications." Proceedings of the 2nd IEEE/ACM International Symposium on Mixed and Augmented Reality. IEEE Computer Society, 2003. 10 pages.*

Cheok A.D., et al., "Augmented reality camera tracking with homographies", IEEE Computer Graphics and Applications, IEEE Service Center, New York, NY, US, vol. 22, No. 6, Nov. 1, 2002, pp. 39-45, XP011095118, ISSN: 0272-1716, DOI: 10.1109/MCG.2002. 1046627 pp. 40-43 figures 2-4.

International Search Report and Written Opinion—PCT/US2012/034831—ISA/EPO—Aug. 22, 2012.

* cited by examiner

DEVICES, METHODS, AND APPARATUSES FOR HOMOGRAPHY EVALUATION INVOLVING A MOBILE DEVICE

CROSS-REFERENCE TO RELATED APPLICATION

This application claims priority under 35 U.S.C. §119(e) from U.S. provisional patent application No. 61/480,609, filed Apr. 29, 2011, the entire contents of which are incorporated by reference herein.

BACKGROUND

1. Field

The subject matter disclosed herein relates to homography evaluation involving mobile devices 2. Information Many mobile communication devices include a camera capable of capturing high-quality still images and live video sequences. In many situations, a user may wish to augment live camera images with virtual objects that do not exist or are not visible in a captured image. These situations may include animating avatars and other three-dimensional objects in games, live technical manuals that describe complex machinery, and many others.

Prior to augmenting a video image, some form of object detection may be performed on a captured video stream. Augmentation may involve extracting features from a video stream that may be used to recognize an object from similar and/or different perspectives. If a sufficient number of features satisfying certain criteria are found to be common to both an object in a video stream and an object retrieved from a database, a determination may be made that a particular object has been detected in a captured video image. Upon detection of the object in an image, augmentation of the image may take place. As a perspective of the video scene changes, the perspective of a virtual object added to the video scene may also change as though the virtual object was present in the originally-captured scene.

However, detecting an object in a video stream may involve extensive processing to establish homography between a reference object image and an image extracted from a video stream. Additionally, even if homography between a reference image and the extracted image is found, the augmentation may not be realistic if the extracted homography does not meet certain criteria. This may be especially problematic while attempting to augment a scene in three dimensions, as the camera angle changes relative to detected objects in a captured two-dimensional image.

SUMMARY

In particular implementations, a method comprises accessing information pertaining to a two-dimensional image indicative of a three-dimensional object, detecting homography between said two-dimensional image indicative of said three-dimensional object and a reference object image, and determining whether said homography indicates pose suitable for image augmentation based, at least in part, on characteristics of an elliptically-shaped area that encompasses at least some of a plurality of inliers distributed within said two-dimensional image.

In another implementation, an apparatus comprises means for accessing information pertaining to a two-dimensional image indicative of a three-dimensional object, means for detecting homography between a reference object image and said two-dimensional image indicative of said three-dimensional object, and means for determining whether said homography indicates pose suitable for image augmentation based, at least in part, on characteristics of an elliptically-shaped area that encompasses at least some of a plurality of inliers within said two-dimensional image.

In another implementation, an article comprises a non-transitory storage medium comprising machine-readable instructions stored thereon which are executable by a processor of a mobile device to access captured image data, the captured image data being representative of a two-dimensional image of a three-dimensional object, to detect homography between said two-dimensional image of said three-dimensional object and a reference object image, and to determine whether said homography indicates pose suitable for image augmentation based, at least in part, on characteristics of an elliptically-shaped area that encompasses at least some of a plurality of inliers distributed in said two-dimensional image.

In another implementation, a mobile device comprises one or more sensors for evaluating homography of a two-dimensional image of a three-dimensional object captured by said mobile device, and one or more processors to detect homography between said image of said three-dimensional object captured in said two-dimensional image and a reference object image, and to determine whether said homography indicates pose suitable for image augmentation based, at least in part, on characteristics of an elliptically-shaped area that encompasses at least some of a plurality of inliers distributed in said two-dimensional image.

BRIEF DESCRIPTION OF DRAWINGS

Non-limiting and non-exhaustive aspects are described with reference to the following figures, wherein like reference numerals refer to like parts throughout the various figures.

DETAILED DESCRIPTION

Devices, methods, and apparatuses are provided that may be implemented in various mobile devices to perform homography evaluation between an object in a captured two-dimensional image and an image of a three-dimensional reference object that may be stored in a database. In implementations, homography may be defined as a transformation from a first projective plane to a second projective plane. In implementations, by geometrically comparing features of an object in a captured image with features from a reference object image and by determining a spatial distribution of the compared features, homography and "pose" may be estimated. In implementations, "pose" may be defined as a combination of rotation and translation of a camera capturing an image with respect to a reference object present in a reference image stored in a database. In implementations, pose may be presented using SE(3) (Special Euclidean Group in 3-Dimensional Space) to describe translation and rotation.

One particular measure of quality of homography and pose may comprise a "reprojection error," which may be characterized as a geometric error between a feature projected from a reference object to a corresponding feature of a captured image. Using magnitudes of a reprojection error from a group of features, and other measures, a decision may be made as to whether detection of an object has occurred. If, indeed, detection has occurred, a decision may also be made as to whether detected keypoints are sufficiently accurate to apply augmentation. In particular implementations, estimates of size of at least first and second spans of a region occupied by homography "inliers" in a two dimensional image from a captured video stream may also be used to determine whether quality of homography indicates pose suitable for image augmentation.

In a particular implementation, a "keypoint" may comprise a location or feature extracted from a captured image displayed in a camera view, such as a corner, mass, apex, or other facet that may be readily identified using computer vision techniques. For example, a keypoint may be located at a center of an associated portion of an image, which may be referred to as an "image patch." Statistics computed on a portion of an image that includes a keypoint may provide a "descriptor" that enables fast comparison with other descriptors of reference objects of images stored in a database. Such a process may account for different camera positions and orientations allowing different perspectives of the object in the reference image and the captured image.

Figure 1:
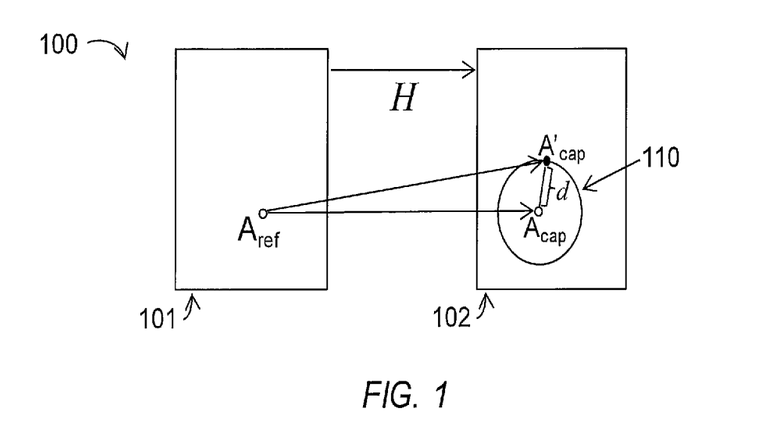
FIG. 1 is an example portion of a reference object image and a portion of a captured object image illustrating, at least in part, a principle of homography in object detection according to an implementation.

FIG. 1 (100) is an example portion of a reference object image and a portion of a captured object image illustrating, at least in part, a principle of homography in object detection according to an implementation. In FIG. 1, homography transform (H) may be established between reference object image 101 and captured object image 102 if at least four non-collinear keypoints common to both objects can be detected. In an implementation, reference object image 101 and captured object image 102 may comprise two-dimensional projections of three-dimensional objects.

In an implementation, homography transform H may be used to project keypoints from reference object image 101 onto captured object image 102. Thus, for example, if a keypoint, such as $A_{ref}$ from reference object image 101, is projected perfectly onto captured object image 102, such as at point $A_{cap}$, it may be seen that perfect homography may exist between reference object image 101 and captured object image 102. However, in many implementations, keypoint $A_{ref}$ may project to $A'_{cap}$, which is separated from $A_{cap}$ by an error distance d, representing a reprojection error of point $A_{ref}$. In an implementation, error distance d between $A'_{cap}$ and $A_{cap}$ may be referred to as a "keypoint error." Additionally, a keypoint error having magnitude d may be represented by keypoint error circle 110, shown in FIG. 1.

In particular implementations, a keypoint extracted from a captured image may be considered an "inlier" if a projection of a corresponding keypoint from a reference object image stored in a database is within a particular distance from a keypoint extracted from the captured image. This "limit" distance, which may be expressed as a distance threshold, may be expressed in number of pixels or some other units such as fraction of camera focal length or even metric units. In an example, keypoint $A_{cap}$ may be an inlier if the individual keypoint reprojection error (d) between $A'_{cap}$ and $A_{cap}$ is less than a distance threshold, which may be expressed in terms of pixels, for example, 5-10 pixels. However, in other implementations, an individual keypoint reprojection error may be permitted to be a larger number of pixels, such as 50 pixels or more, or may be permitted to be a smaller number, such as less than five pixels.

In other implementations, an individual keypoint reprojection error may be expressed in terms of focal length, such as a fraction of 1/100 multiplied by a camera focal length (0.01× focal length). In other implementations, an individual keypoint reprojection error may be permitted to be a larger or a smaller amount, such as 0.005 multiplied by a focal length or, perhaps, 0.015 multiplied by the focal length of a camera capturing an image.

In implementations, at least two conditions may be used to indicate detection of an object with adequate confidence. A first condition may relate to an estimated homography having a lower threshold number of inliers. In one implementation, ten or more inliers may be sufficient; however, in other implementations, a smaller number of inliers, such as seven or eight inliers, may be sufficient indicate position of an object in an image with adequate confidence. A second condition, at least in some implementations, may pertain to homography reprojection error computed using inliers smaller than a threshold amount.

In implementations, reprojection error may be computed as root mean square deviation (RMSD), which may also be referred to as Root Mean Square Error (RMSE). In other implementations, other measures of homography reprojection error may be used, such as absolute deviation, in which reprojection error of an individual keypoint reprojection may be expressed as an absolute number of pixels. In other implementations, other measures of a reprojection error may be employed, and claimed subject matter is not limited in this regard. In at least one implementation, an upper limit of homography reprojection error may be referred to as homography distance threshold and may be expressed in pixels using number like 1, 1.5, 2, 2.1, and so on.

Figure 2:
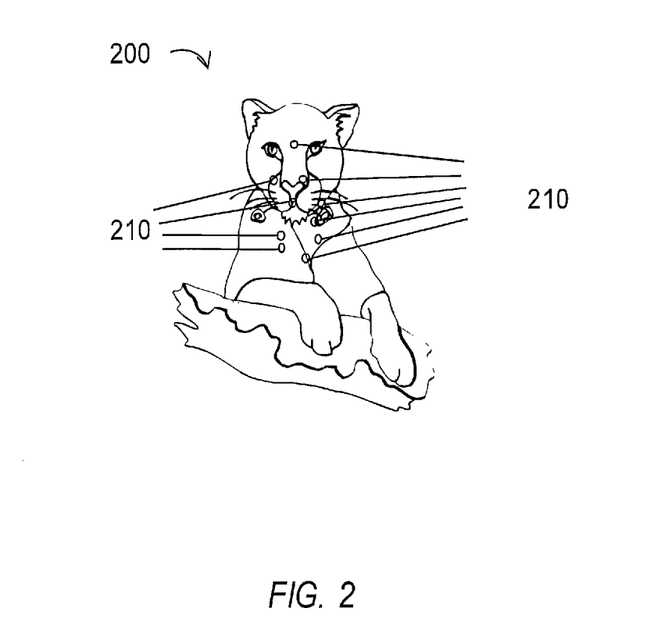
FIG. 2 shows a captured image along with a number of inliers according to an implementation.

FIG. 2 shows a captured image along with a number of inliers according to an implementation. In FIG. 2, inliers 210 represent keypoints of a reference image stored in a database matched, by way of a homography transform, with keypoints extracted from a captured image. In FIG. 2, ten of inliers 210 are shown. For example, keypoint error circles (e.g. $d_1, d_2, d_3, \ldots, d_{10}$) may be associated with inliers 210. In an implementation a keypoint error for each of inliers 210 may be less than a particular upper threshold value (e.g. $d_1, d_2, d_3, d_{10} < d_{max}$). Additionally, in some implementations, if a root-mean-square of keypoint errors (e.g. $d_1, d_2, d_3, d_{10}$) is within a particular threshold value, a decision may be made that a specific object has been detected in a captured image if other conditions are satisfied.

Figure 3:
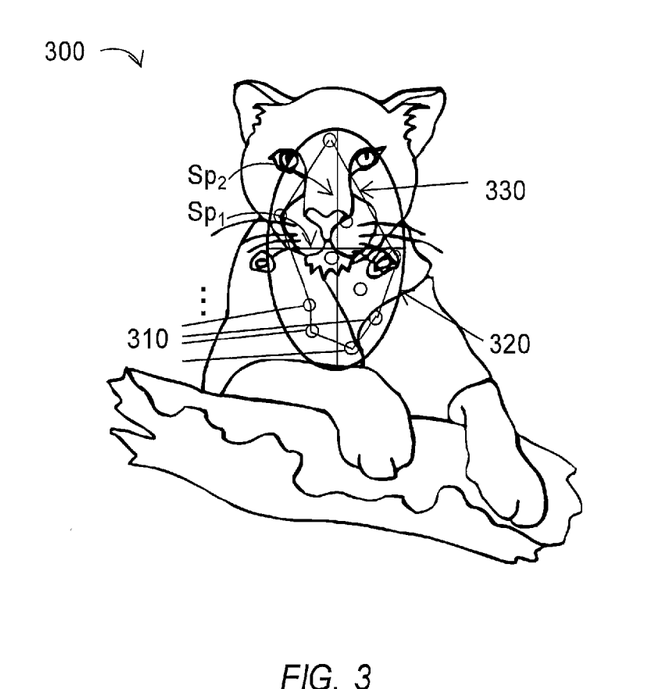
FIG. 3 shows the captured image of FIG. 2 along with an ellipse encompassing inliers and a polygon determined by a convex hull according to an implementation.

FIG. 3 shows the captured image of FIG. 2 along with an ellipse encompassing inliers and a polygon determined by a convex hull according to an implementation. In FIG. 3, a captured image of FIG. 2 has been lightened to emphasize inliers 310, details of ellipse 320, and polygon 330. For reasons of clarity, inliers 310 of FIG. 2 are not individually identified in FIG. 3. An example of an implementation of a convex hull algorithm is provided with reference to FIGS. 4A, 4B, and 4C.

In an implementation, inliers of FIG. 3 may be modeled as point masses that may contribute to a moment of rotational inertia, as may be used in fields such as Mechanics of Rigid Bodies to determine an object's principal axes of rotational inertia and that object's dynamics of rotational motion. By way of determining principal axes of rotation of the inliers shown in FIG. 3, characteristics of an area, such as an ellipse, that encompasses inliers may be determined. Further, in at least one implementation, by enclosing inliers within a polygon that comprises approximately the same area as the ellipse, such as by way of a convex hull algorithm, translation from abstract units to pixels may be performed. This may assist in determining whether homography indicating pose suitable for image augmentation has been detected. In an implementation, it may be desirable to determine if a region occupied by a homography inlier possesses certain dimensional attributes, such as overall size and relationships between, for example, the size of major and minor axes of an elliptical region that includes inliers.

In implementations, methods taken from Mechanics of Rigid Bodies may be used in determining if an inlier region possesses favorable dimensional qualities. In implementations, inliers of an input image may be modeled as point masses of a rigid body in which rotational properties of a rigid body may depend upon a distribution of mass within the rigid body. Principal axes of a rigid body may correspond to axes of maximal and minimal rotational axes of the body, in which maximal and minimal rotational axes are normal to one another. In at least one coordinate system, a third principal axis (which may correspond to a Z-axis) of rotational inertia may be normal to two other axes (which may correspond to X and Y-axes). Principal axes of inertia may be dependent on spatial distribution of mass within the body and may provide an indication of an overall shape of a mass that includes the point masses. In Mechanics of Rigid Bodies, it may be customary to represent a rigid body by way of an ellipsoid having perhaps a similar mass but having uniform density and having a similar tensor of inertia. Axes of an ellipsoid may coincide with principal axes of rotational inertia of the body.

Rotational moments of inertia of a rigid body with respect to axes of a Cartesian frame of reference may be expressed in tensor form as:

$$T = \begin{bmatrix} T_{xx} & T_{xy} & T_{xz} \\ T_{yx} & T_{yy} & T_{yz} \\ T_{zx} & T_{zy} & T_{zz} \end{bmatrix} \quad (1)$$

For bodies consisting of unit point masses the elements of the tensor may be expressed as:

$$T_{xx} = \sum_1^N (y_k^2 + z_k^2),\ T_{yy} = \sum_1^N (x_k^2 + z_k^2),\ T_{zz} = \sum_1^N (x_k^2 + y_k^2),$$
$$T_{xy} = T_{yx} = -\sum_1^N x_k y_k,\ T_{xz} = T_{zx} = -\sum_1^N x_k z_k,$$
$$T_{yz} = T_{zy} = -\sum_1^N z_k y_k$$

From the expressions above, it can be seen that the matrix representing the tensor of inertia is symmetric. In the elements that comprise the tensor shown above, N represents the number of inliers used to determine suitable homography, k is an inlier index, $x_k$, $y_k$, $z_k$ are inlier coordinates, and summation may be performed for k=1, ..., N. For the ten inliers of 210 shown in FIGS. 2 and 3 (N=10), k assumes values of 1-10 as a contribution of each inlier to an overall moment may be computed.

It may be convenient to introduce Cartesian system with axes x and y aligned with image borders and axis z being normal to the image. In an implementation, a rigid body may be modeled as a set of unit masses at keypoint locations on a flat surface lying in the plane of the image. Accordingly, $z_k$ coordinates of all keypoints are zero (0) which greatly simplifies expression for tensor element:

$$T_{xx}=\Sigma_1^N(y_k^2), T_{yy}=\Sigma_1^N(x_k^2), T_{zz}=\Sigma_1^N(x_k^2+y_k^2),$$

$$T_{xy}=T_{yx}=-\Sigma_1^N x_k y_k, T_{xz}=T_{zx}=0\ T_{yz}=T_{zy}=0 \quad (1a)$$

This implies that expression (1) may be rewritten as:

$$T = \begin{bmatrix} T_{xx} & T_{xy} & 0 \\ T_{yx} & T_{yy} & 0 \\ 0 & 0 & T_{zz} \end{bmatrix} \quad (2)$$

Note the presence of zero (0) elements in the matrix representing the tensor of inertia (2). In implementations, by computing the eigenvalues and eigenvectors of tensor (2), the orientation and span of two principal axes of an ellipse may be determined in closed form. Thus, in an implementation, in view of z=0, the last row and column of tensor (2) may be disregarded and the tensor may be reducible to an eigenvalue problem comprising computing eigenvalues of a 2×2 matrix, which may be given by given by:

$$T = \begin{bmatrix} T_{xx} & T_{xy} \\ T_{yx} & T_{yy} \end{bmatrix} \quad (3a)$$

Eigenvalues of any square matrix A may be found by finding roots of its characteristic polynomial of matrix A which may be given by the determinant of matrix (A−Iλ), where I represents unit matrix:

$$\det\left(\begin{bmatrix} T_{xx} - \lambda & T_{xy} \\ T_{yx} & T_{yy} - \lambda \end{bmatrix}\right) = 0 \quad (3b)$$

Accordingly, eigenvalues of T may be found by solving the quadratic equation:

$$(T_{xx}-\lambda)(T_{yy}-\lambda)=0 \quad (4)$$

In a simplified example illustrating the eigenvalue and eigenvector computation, let the elements of the 2×2 matrix of expression (2) be $T_{xx}$=2, $T_{xy}$=1, $T_{yx}$=1, and $T_{yy}$=2. In the example, each element may be computed using (1a). In particular implementations, the elements of the 2×2 matrix (2) may assume much larger, non-integer values than used in this example. However, for the purposes of illustration, a 2×2 matrix representing tensor (2) may be expressed as:

$$T = \begin{bmatrix} 2 & 1 \\ 1 & 2 \end{bmatrix}$$

Accordingly, the equation for the eigenvalues, in accordance with equation (3b), may be expressed as:

$$\det\left(\begin{bmatrix} 2-\lambda & 1 \\ 1 & 2-\lambda \end{bmatrix}\right) = 0$$

This yields the expression: $\lambda^2-4\lambda+3=0$. Finding the roots of this polynomial yields $\lambda_1=3$, and $\lambda_2=1$.

To find the eigenvector for this example, first using $\lambda_1$, a general expression for eigenvector calculation may be used:

$$(A-\lambda I)x=0 \quad (5)$$

Rewriting equation (5) in a matrix form yields the following expression:

$$\begin{bmatrix} 2 & 1 \\ 1 & 2 \end{bmatrix}\begin{bmatrix} x \\ y \end{bmatrix} = 3\begin{bmatrix} x \\ y \end{bmatrix} \quad (6)$$

Equation (6) may then be expressed as a system of two equations:

$$2x+y=3x, \text{ and } x+2y=3y \quad (7)$$

The system of equations (7) can be simplified as:

$$-x+y=0, \text{ or}$$

$$x=y$$

For this example, the same procedure can be used for $\lambda_2=1$, which, may be summarized as:

$$\begin{bmatrix} 2 & 1 \\ 1 & 2 \end{bmatrix}\begin{bmatrix} x \\ y \end{bmatrix} = \begin{bmatrix} x \\ y \end{bmatrix}$$

$$2x+y=x$$

$$x+2y=y$$

Simplifying further yields the expression:

$$x+y=0, x=-y$$

Thus, eigenvalues $(\lambda_1, \lambda_2)$ yield eigenvectors $(e_1, e_2)$, such as:

$$\lambda_1 = 3, e_1 = \begin{bmatrix} 1 \\ 1 \end{bmatrix} \text{ and } \lambda_2 = 1, e_2 = \begin{bmatrix} -1 \\ 1 \end{bmatrix}$$

Eigenvalues of a tensor of inertia may correspond to the moments of inertia about principal axes of inertia of a rigid body. Additionally, the eigenvectors may represent axes of inertia of the inliers 210 if each of the inliers 210 is modeled as unit point masses of a rigid body. It may be convenient to compute elements of a tensor of inertia of a rigid body using Cartesian coordinates having an origin at the center of mass of the body. For a flat rigid body consisting of point masses ($m_k$) coordinates of the center of mass may be expressed as:

$$g_x = \frac{\sum_{k=1}^{N} m_k x_k}{N} \text{ and } g_y = \frac{\sum_{k=1}^{N} m_k y_k}{N} \quad (8)$$

If point masses ($m_k$) are equal to 1, such as in the case of the inliers 210, expression (8) may simplify to;

$$g_x = \frac{\sum_{k=1}^{N} x_k}{N} \text{ and } g_x = \frac{\sum_{k=1}^{N} y_k}{N} \quad (9)$$

When computing elements of tensor of inertia coordinates ($x_k, y_k$) of inliers, an origin of a Cartesian reference frame may be transformed to correspond to a center of mass, as may be expressed as follows:

$$x_k'=x_k-g_x \text{ and } y_k'=y_k-g_y \quad (10)$$

In a more general form, expression (3a) can be rewritten as:

$$T = \begin{bmatrix} a & b \\ b & c \end{bmatrix} \quad (11)$$

Further, an expression for the calculation of the eigenvalues may be summarized as:

$$\text{determinant}(T-\lambda I)=0$$

$$(a-\lambda)(c-\lambda)-b^2=0$$

$$\lambda^2-(a+c)\lambda+ac-b^2=0 \quad (12)$$

Wherein the above expression yields closed-form solution in which:

$$\lambda_1 = \frac{a+c-\sqrt{\Delta}}{2} \text{ and } \lambda_2 = \frac{a+c+\sqrt{\Delta}}{2} \quad (13)$$

Wherein the discriminant ($\Delta$) may be:

$$\Delta=(a+c)^2-4(ac-b^2) \quad (14)$$

In implementations, principal axes or "spans" ($Sp_1$ and $Sp_2$) of ellipse 320 (of FIG. 3) having uniform density of mass may be computed by finding roots of equation (12). In implementations, the quadratic equation yields eigenvalues that are both real and positive since that tensor of inertia is symmetric and positive-definite. The principal axes of an ellipse may be proportional to the square roots of its principal moments of inertia. In an implementation, computing a tensor of inertia of a rigid body includes determining point masses corresponding to the inliers 210, followed by finding principal axes of an ellipse of uniform density having a similar tensor of inertia. In some implementations, the eigenvector corresponding to smaller eigenvalue may be the direction of the larger of spans $Sp_1$ and $Sp_2$.

From the field of Mechanics of Rotational Bodies, for an ellipse in an x-y plane, having axes or spans of $Sp_1$ and $Sp_2$, the tensor of inertia can be expressed as:

$$\frac{\pi}{4}\begin{bmatrix} Sp_1 Sp_2^3 & 0 & 0 \\ 0 & Sp_1^3 Sp_2 & 0 \\ 0 & 0 & Sp_1 Sp_2(Sp_1^2+Sp_2^2) \end{bmatrix} \quad (15)$$

Wherein expression (15) represents a diagonal matrix, which implies that its eigenvalues are diagonal elements of the matrix. Further, from fundamental geometry, the area of an ellipsis with axes $Sp_1$ and $Sp_2$ of FIG. 3, for example, may be expressed as:

$$S_e = \pi Sp_1 Sp_2$$

In implementations, if the smaller of spans $Sp_1$ and $Sp_2$ is divided by the larger of $Sp_1$ and $Sp_2$ is approximately equal to or greater than 0.3, homography that indicates pose suitable for image augmentation may be indicated. However, it should be understood that in other implementations, homography that indicates pose suitable for image augmentation may be possible from a different ratio of the shorter of $Sp_1$ and $Sp_2$ divided by the larger of $Sp_1$ and $Sp_2$, such as a ratio less than 0.3 or greater than 0.3, and claimed subject matter is not limited in this respect.

In implementations, a convex hull technique, which will be discussed in greater detail with reference to FIG. 4, may be used to join any pair of points of the set of points. A convex hull of any set may be the smallest convex set containing a given set of points. In a general example, given a set consisting of points on a plane, a convex hull may have a border corresponding to a convex polygon. In an implementation, a convex hull of the inliers 210 may be computed.

To compute the axes of an ellipse, such as ellipse 320 of (FIG. 3) within which inliers 210 may be inscribed, axes $Sp_1$ and $Sp_2$, may correspond to axes of an ellipse having an area approximately equal to the area of the convex hull. The area of the convex hull ($S_c$) of expression (16), below, may be set equal to the area of ellipse 320. Accordingly, this equivalence of $S_e$ and $S_c$ and their relationship to area of an ellipse (from fundamental geometry) can be expressed as:

$$S_c = S_e = \pi Sp_1 Sp_2, \quad (16)$$

$$\text{in which } \frac{Sp_2}{Sp_1} = \frac{\sqrt{\lambda_1}}{\sqrt{\lambda_2}} \quad (16a)$$

In expression 16a, the longer of the two axes corresponds to $Sp_2$, and the larger of the two eigenvalues corresponds to $A_1$.

Figure 4A:
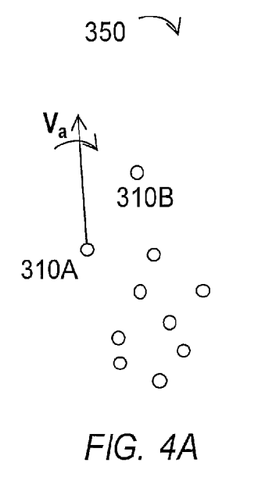
FIGS. 4A, 4B, and 4C illustrate operations pertaining to a convex hull technique according to an implementation.
Figure 4B:
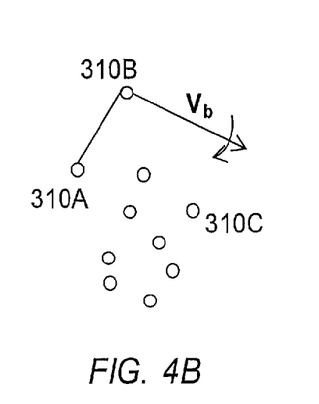
Figure 4C:
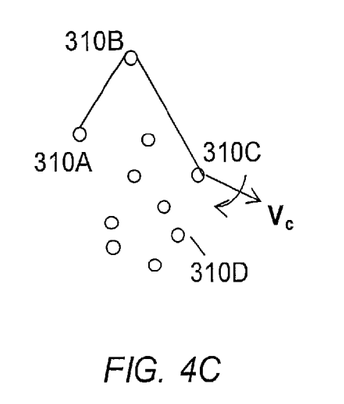

FIGS. 4A, 4B, and 4C illustrate operations pertaining to a convex hull technique according to an implementation. In FIG. 4 (350), a group of inliers, which may correspond to inliers 310 of FIG. 3, is shown. In FIG. 4A, a leftmost inlier (310A) lying in an x-y plane may be detected. A vector ($V_a$) may be extended from 310A and rotated in a clockwise manner until reaching a second inlier, 310B. Upon reaching second inlier 310B, a second vector ($V_b$), may be extended from inlier 310B and rotated clockwise until reaching inlier 310C, as shown in FIG. 4B. Upon reaching inlier 310C, the vector $V_c$ may be extended from inlier 310C, perhaps to inlier 310D. In this manner, by way of successive clockwise rotation of vector that extends from inliers, the vertices of a polygon that includes each of inliers 310, of FIG. 3, may be determined.

As a result of a convex hull computation, polygon 330 may correspond to a general shape that may include the distribution of inliers 310 of FIG. 3. Further, application of a convex hull technique may provide a conversion from abstract units to pixels. In an implementation, by converting to pixels, a determination may be made as to whether the longer of $Sp_1$ and $Sp_2$ spans at least a threshold percentage, such as 20% of a length of the captured image, to provide homography that indicates pose suitable for image augmentation. However, in other implementations, a different percentage, such as 15% of a captured image or less, or a larger percentage, such as 25% or more may provide homography that indicates pose suitable for image augmentation, and claimed subject matter is not limited in this respect.

In an implementation, if homography that indicates pose suitable for image augmentation is not found for a given captured image, the image may be discarded and a second image from an image capture device may be analyzed. In an implementation, a succession of images may be analyzed until an image that provides homography that indicates pose suitable for image augmentation is found. If homography that indicates pose suitable for image augmentation is found, object detection may be suspended. If image augmentation can be performed, poses from successive frames may be obtained by way of tracking an image from an input capture device. In implementations, tracking an image from successive frames may represent a simpler and less-expensive process than object detection.

In implementations, pose may be computed using intrinsic parameters of the image capture device, such as focal length, position of a principal point of a projection, and so on. If suitable pose can be computed, the detected object within the image may be tracked from frame to frame, which, as previously mentioned, may employ fewer computing resources than object detection. The captured image may then be augmented by way of virtual objects introduced and manipulated along with detected objects in successive video frames.

Figure 5:
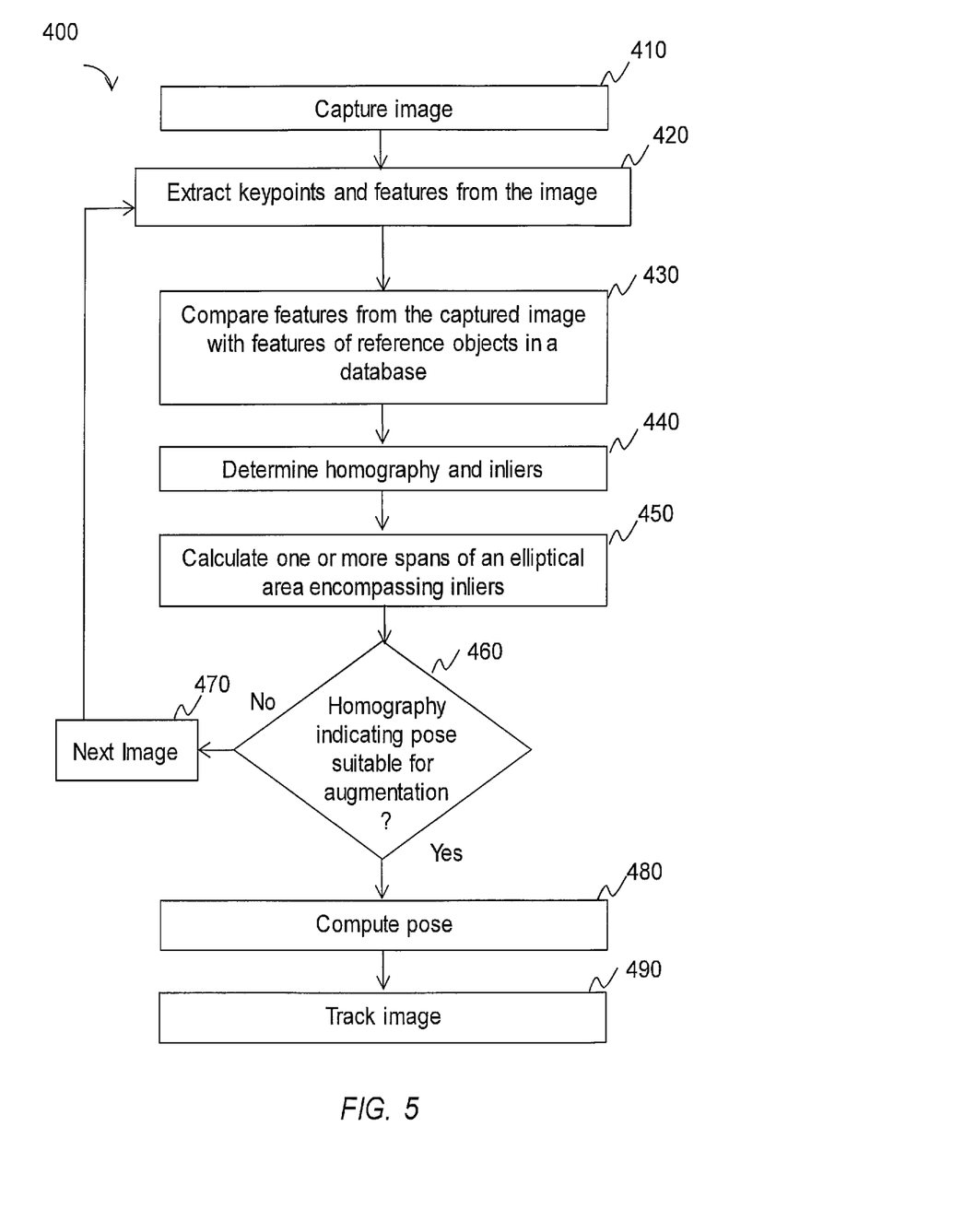
FIG. 5 is a diagram of a process for performing homography evaluation in a mobile device according to an implementation.

FIG. 5 is a diagram of a process for performing homography evaluation in a mobile device according to an implementation. Other implementations may include additional blocks than those shown and described in FIG. 5, fewer blocks, blocks occurring in an order different from FIG. 5, or any combination thereof. In certain implementations, various blocks of FIG. 5 may be performed by a server or other network resource that manages or directs the operations of one or more mobile devices.

The method of FIG. 5 begins at step 410, in which an image is captured by an image capture device, such as a video camera, camera-equipped smart phone, or like apparatus. At block 420, keypoints and features are extracted from a captured image. At block 430, features extracted from the captured image are compared to features of reference objects in the database. At block 440, if a predetermined lower threshold number of input features match a reference object in a database, homography may be estimated. At block 440, features may be matched by a measure of similarity between descriptors of an object in a captured image and descriptors of an object in a reference image stored in a database. In an implementation, a predetermined lower threshold of, for example, 20 matches made by way of a comparison of descriptors similar to an object of a captured image and an object stored in a database may result in performing block 450. In other implementations, a lesser or greater number of descriptors of an object of a captured image that correspond to an object of an image stored in a database may result in performing block 450.

The method may continue at block 450, in which an attempt may be made to determine homography between an object of a reference image and an object of a captured image, which may involve inliers determined at block 440. Block 450 may include computing spans of an area, such as the elliptically-shaped area of FIG. 3 having spans $Sp_1$ and $Sp_2$ encompassing inliers 310. In an implementation, block 450 may also comprise computing at least one eigenvector derived from eigenvalues that are computed in a manner that accords with computing rotational moments of inertia of a flat, rigid body. For computing eigenvalues, inliers may be modeled as point masses and used to compute a moment of rotational inertia about one or more axes by way of a 2×2 matrix, for example. Block 450 may further comprise applying a convex hull technique to surround inliers with a polygon having approximately the same area, such as an elliptically shaped area, which may be defined by the spans that may be computed using eigenvalues.

Continuing at block 460, a determination may be made that homography that indicates pose suitable for image augmentation has been detected. In an implementation, homography that indicates pose suitable for image augmentation may be characterized according to geometrical parameters of an area, such as an elliptically-shaped area, defined by spans computed at block 450. In one implementation, homography that indicates pose suitable for image augmentation may be detected if a ratio of a first span of an area to a second span of an area, computed at block 450, is 0.3 or greater. Block 460 may further include determining if at least one span comprises at least 20% of the overall length in a vertical or a horizontal dimension of a captured image. However, claimed subject matter is not limited to particular ratios of the first to second spans, nor to a particular percentage of an overall height or width of a particular captured image.

If homography that indicates pose suitable for image augmentation is not detected, block 470 may be performed in which a second or next image may be evaluated. If the determination of block 460 indicates that homography indicating pose suitable for image augmentation has been detected, block 480 may be performed in which pose may be computed using intrinsic parameters of an image capture device, such as, for example, focal length and position of a principal point of a projection, and so on. Block 480 may further comprise suspending object detection. The method may continue at block 490 in which the image may be tracked in succeeding frames that include the captured object image.

Figure 6:
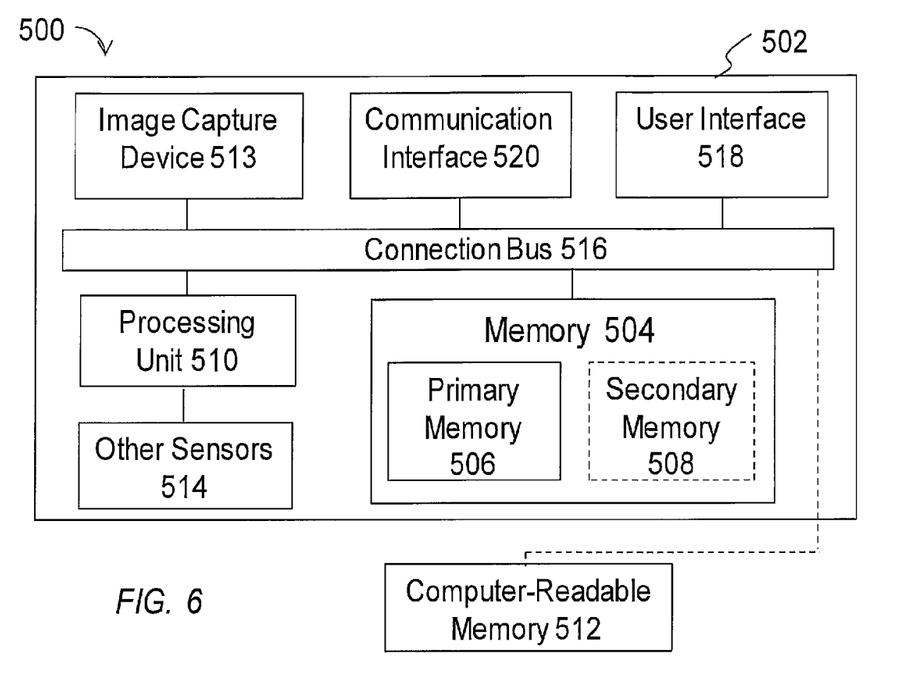
FIG. 6 is a schematic diagram illustrating an example computing environment associated with a mobile device according to an implementation.

FIG. 6 is a schematic diagram illustrating an implementation of an example computing environment 500 that may include one or more networks or devices capable of partially or substantially implementing or supporting one or more processes for homography evaluation in a mobile device. It should be appreciated that all or part of various devices or networks shown in computing environment 500, processes, or methods, as described herein, may be implemented using various hardware, firmware, or any combination thereof along with software.

Computing environment 500 may include, for example, a mobile device 502, which may be communicatively coupled to any number of other devices, mobile or otherwise, via a suitable communications network, such as a cellular telephone network, the Internet, mobile ad-hoc network, wireless sensor network, or the like. In an implementation, mobile device 502 may be representative of any electronic device, appliance, or machine that may be capable of exchanging information over any suitable communications network. For example, mobile device 502 may include one or more computing devices or platforms associated with, for example, cellular telephones, satellite telephones, smart telephones, personal digital assistants (PDAs), laptop computers, personal entertainment systems, e-book readers, tablet personal computers (PC), personal audio or video devices, personal navigation devices, or the like. In certain example implementations, mobile device 502 may take the form of one or more integrated circuits, circuit boards, or the like that may be operatively enabled for use in another device. Although not shown, optionally or alternatively, there may be additional devices, mobile or otherwise, communicatively coupled to mobile device 502 to facilitate or otherwise support one or more processes associated with computing environment 500. Thus, unless stated otherwise, to simplify discussion, various functionalities, elements, components, etc. are described below with reference to mobile device 502 may also be applicable to other devices not shown so as to support one or more processes associated with example computing environment 500.

Memory 504 may represent any suitable or desired information storage medium capable of storing information pertaining to a two-dimensional image of a three-dimensional object. For example, memory 504 may include a primary memory 506 and a secondary memory 508. Primary memory 506 may include, for example, a random access memory, read only memory, etc. While illustrated in this example as being separate from a processing unit 510, it should be appreciated that all or part of primary memory 506 may be provided within or otherwise co-located/coupled with processing unit 510. Secondary memory 508 may include, for example, the same or similar type of memory as primary memory or one or more information storage devices or systems, such as, for example, a disk drive, an optical disc drive, a tape drive, a solid state memory drive, etc. In certain implementations, secondary memory 508 may be operatively receptive of, or otherwise enabled to be coupled to, a non-transitory computer-readable medium 512.

Computer-readable medium 512 may include, for example, any medium that can store or provide access to information, code or instructions (e.g., an article of manufacture, etc.) for one or more devices associated with computing environment 500. For example, computer-readable medium 512 may be provided or accessed by processing unit 510. As such, in certain example implementations, the methods or apparatuses may take the form, in whole or part, of a computer-readable medium that may include computer-implementable instructions stored thereon, which, if executed by at least one processing unit or other like circuitry, may enable processing unit 510 or the other like circuitry to perform all or portions of a location determination processes, sensor-based or sensor-supported measurements (e.g., acceleration, deceleration, orientation, tilt, rotation, etc.), keypoint extraction and/or pose computation from inliers from a captured image, or any like processes to facilitate or otherwise support homography detection and/or evaluation within mobile device 502. In example implementations, processing unit 510 may be capable of accessing a storage medium, such as memory 504, which may store information pertaining to a two-dimensional image of a three-dimensional object. In certain example implementations, processing unit 510 may be capable of performing or supporting other functions, such as communications, gaming, or the like.

Processing unit 510 may be implemented in hardware or a combination of hardware and software. Processing unit 510 may be representative of one or more circuits capable of performing at least a portion of information computing technique or process. By way of example but not limitation, processing unit 510 may include one or more processors, controllers, microprocessors, microcontrollers, application specific integrated circuits, digital signal processors, programmable logic devices, field programmable gate arrays, or the like, or any combination thereof for detecting homography between a reference object image and a two-dimensional image indicative of a three-dimensional object. Processing unit 510 may also determine whether the homography indicates pose suitable for augmentation based, at least in part, on characteristics of an elliptically-shaped area that encompasses at least some inliers distributed in the two-dimensional image. Processing unit 510 may also be capable of determining that the elliptically-shaped area encompasses at least a lower threshold percentage, such as approximately 20%, of the length of the two-dimensional image. Processing unit 510 may also be capable of computing at least one eigenvalue of a matrix that corresponds to a moment of rotational inertia of point masses about an axis of the elliptically-shaped area encompassing at least some inliers within the elliptically-shaped area. Processor 510 may also be capable of applying a convex hull technique to inliers within the elliptically-shaped area. Processor 510 may also be capable of comparing keypoints extracted from the two-dimensional image with keypoints from the reference object image.

Mobile device 502 may include various components or circuitry, such as, for example, one or more image capture devices 513, or various other sensor(s) 514, such as a magnetic compass, a gyroscope, a video sensor, a gravitometer, etc. to facilitate or otherwise support one or more processes associated with operating environment 500. For example, such sensors may provide analog or digital signals to processing unit 510. Although not shown, it should be noted that mobile device 502 may include an analog-to-digital converter (ADC) for digitizing analog signals from one or more sensors. Optionally or alternatively, such sensors may include a designated (e.g., an internal, etc.) ADC(s) to digitize respective output signals, although claimed subject matter is not so limited.

Although not shown, mobile device 502 may also include a memory or information buffer to collect suitable or desired information, such as, for example, accelerometer measurement information (e.g., accelerometer traces), as previously mentioned. Mobile device may also include a power source, for example, to provide power to some or all of the components or circuitry of mobile device 502. A power source may be a portable power source, such as a battery, for example, or may comprise a fixed power source, such as an outlet (e.g. in a house, electric charging station, etc.). It should be appreciated that a power source may be integrated into (e.g., built-in, etc.) or otherwise supported by (e.g., stand-alone, etc.) mobile device 502.

Mobile device 502 may include one or more connection bus 516 (e.g., buses, lines, conductors, optic fibers, etc.) to operatively couple various circuits together, and a user interface 518 (e.g., display, touch screen, keypad, buttons, knobs, microphone, speaker, trackball, data port, etc.) to receive user input, facilitate or support sensor-related signal measurements, or provide information to a user. Mobile device 502 may further include a communication interface 520 (e.g., wireless transmitter or receiver, modem, antenna, etc.) to allow for communication with one or more other devices or systems over one or more suitable communications networks, as was indicated.

In some implementations, mobile device 502 may work or operate with one or more network resources to perform the techniques described herein. For example, image information may be captured using image capture device 513 of mobile device 502, and at least some of the image information may be transmitted to a network resource such as a server for processing. For example, reference image data may be stored at the server, and homography evaluation could be performed. This may include extracting keypoints and features from the camera image, comparing features from the captured image with features of reference objects in a database. The server may also determine homography and inliers and calculate one or more spans of an elliptical area encompassing the inliers. The server may additionally determine if homography indicates pose suitable for image augmentation. The server may additionally compute pose and track the image.

Figure 7:
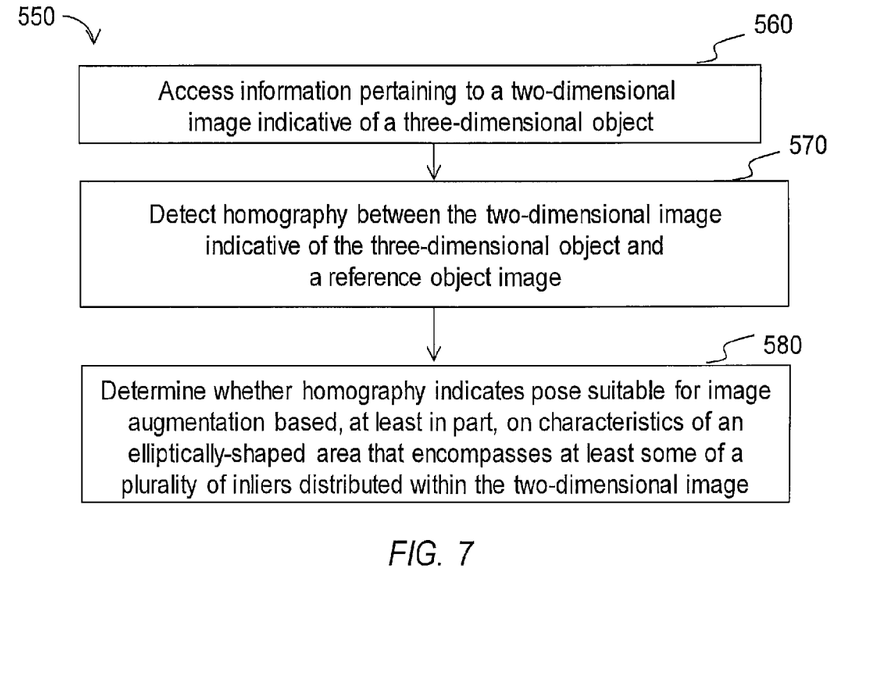
FIG. 7 is a diagram of a simplified process for performing homography evaluation in a mobile device according to an implementation.

FIG. 7 is a diagram of a simplified process for performing homography evaluation in a mobile device, such as mobile device 502, according to an implementation. In certain other implementations, the simplified process of FIG. 7 may be performed at a server or other network resource in communication with mobile device 502. Other implementations may include additional blocks than those shown and described in FIG. 7, fewer blocks, blocks occurring in an order different from FIG. 7, or any combination thereof. The method of FIG. 7 begins at block 560, which includes accessing information pertaining to a two-dimensional image indicative of a three-dimensional object. Block 570 includes detecting homography between the image of the three-dimensional object captured in the two-dimensional image and a reference object image. At 580, a determination is made whether homography indicates pose suitable for image augmentation based, at least in part, on characteristics of an elliptically-shaped area that encompasses at least some of a plurality of inliers distributed in the two-dimensional image.

Methodologies described herein may be implemented by various means depending upon applications according to particular features or examples. For example, such methodologies may be implemented in hardware, firmware, software, discrete/fixed logic circuitry, any combination thereof, and so forth. In a hardware or logic circuitry implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices or units designed to perform the functions described herein, or combinations thereof, just to name a few examples.

For a firmware or software implementation, the methodologies may be implemented with modules (e.g., procedures, functions, etc.) having instructions that perform the functions described herein. Any machine-readable medium tangibly embodying instructions may be used in implementing the methodologies described herein. For example, software codes may be stored in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored. In at least some implementations, one or more portions of the herein described storage media may store signals representative of data or information as expressed by a particular state of the storage media. For example, an electronic signal representative of data or information may be "stored" in a portion of the storage media (e.g., memory) by affecting or changing the state of such portions of the storage media to represent data or information as binary information (e.g., ones and zeros). As such, in a particular implementation, such a change of state of the portion of the storage media to store a signal representative of data or information constitutes a transformation of storage media to a different state or thing.

As was indicated, in one or more example implementations, the functions described may be implemented in hardware, software, firmware, discrete/fixed logic circuitry, some combination thereof, and so forth. If implemented in software, the functions may be stored on a physical computer-readable medium as one or more instructions or code. Computer-readable media include physical computer storage media. A storage medium may be any available physical medium that can be accessed by a computer. By way of example, and not limitation, such computer-readable media can comprise RAM, ROM, EEPROM, CD-ROM or other optical disc storage, magnetic disk storage or other magnetic storage devices, or any other medium that can be used to store desired program code in the form of instructions or data structures and that can be accessed by a computer or processor thereof. Disk and disc, as used herein, includes compact disc (CD), laser disc, optical disc, digital versatile disc (DVD), floppy disk and blue-ray disc where disks usually reproduce data magnetically, while discs reproduce data optically with lasers.

As discussed above, a mobile device may be capable of communicating with one or more other devices via wireless transmission or receipt of information over various communications networks using one or more wireless communication techniques. Here, for example, wireless communication techniques may be implemented using a wireless wide area network (WWAN), a wireless local area network (WLAN), a wireless personal area network (WPAN), or the like. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (WCDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, or some other type of network, for example. The techniques may also be implemented in conjunction with any combination of WWAN, WLAN, or WPAN. Wireless communication networks may include so-called next generation technologies (e.g., "4G"), such as, for example, Long Term Evolution (LTE), Advanced LTE, WiMAX, Ultra Mobile Broadband (UMB), or the like.

In one particular implementation, a mobile device may, for example, be capable of communicating with one or more femtocells facilitating or supporting communications with the mobile device for the purpose of estimating its location, orientation, velocity, acceleration, or the like. As used herein, "femtocell" may refer to one or more smaller-size cellular base stations that may be enabled to connect to a service provider's network, for example, via broadband, such as, for example, a Digital Subscriber Line (DSL) or cable. Typically, although not necessarily, a femtocell may utilize or otherwise be compatible with various types of communication technology such as, for example, Universal Mobile Telecommunications System (UTMS), Long Term Evolution (LTE), Evolution-Data Optimized or Evolution-Data only (EV-DO), GSM, Worldwide Interoperability for Microwave Access (WiMAX), Code division multiple access (CDMA)-2000, or Time Division Synchronous Code Division Multiple Access (TD-SCDMA), to name just a few examples among many possible. In certain implementations, a femtocell may comprise integrated WiFi, for example. However, such details relating to femtocells are merely examples, and claimed subject matter is not so limited.

In addition, computer-readable code or instructions may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, and microwave. Combinations of the above may also be included within the scope of physical transmission media. Such computer instructions or data may be transmitted in portions (e.g., first and second portions) at different times (e.g., at first and second times). Some portions of this Detailed Description are presented in terms of algorithms or symbolic representations of operations on binary digital signals stored within a memory of a specific apparatus or special purpose computing device or platform. In the context of this particular Specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered a self-consistent sequence of operations or similar signal processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures or characteristics. However, it should be noted that this is merely an illustrative example and claimed subject matter is not limited to this example.

While certain example techniques have been described and shown herein using various methods or systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to particular examples disclosed, but that such claimed subject matter may also include all implementations falling within the scope of the appended claims, and equivalents thereof.

What is claimed is:

1. A method comprising:
accessing, from a video frame stored in a memory, a two-dimensional image indicative of a three-dimensional object;
detecting homography between said two-dimensional image indicative of said three-dimensional object and a reference object image;
determining whether said homography indicates pose suitable for image augmentation based, at least in part, on a ratio of a first span to a second span of an elliptically-shaped area that encompasses at least some of a plurality of inliers distributed in said two-dimensional image; and
responsive to determining that said homography indicates pose suitable for image augmentation:
tracking said two-dimensional image, from said video frame, in one or more successive video frames; and
inserting said reference object image into at least one of said one or more successive video frames.

2. The method of claim 1, wherein said at least some of said plurality of inliers are modeled as point masses that contribute to a moment of rotational inertia about an axis of said elliptically-shaped area that encompasses at least some of said plurality of inliers.

3. The method of claim 2, wherein said determining further comprises:
computing at least one eigenvalue of a matrix that corresponds to said moment of rotational inertia about said axis.

4. The method of claim 3, further comprising:
computing an eigenvector from said at least one eigenvalue, said eigenvector determining said first span of said elliptically-shaped area that encompasses said at least some of said plurality of inliers distributed within said elliptically-shaped area of said two-dimensional image.

5. The method of claim 2, wherein said determining further comprises:
detecting that a ratio of said first span of said elliptically-shaped area to said second span of said elliptically-shaped area is at least 0.3.

6. The method of claim 5, wherein determining further comprises:
detecting that at least one of said first span and said second span includes at least 20% of a length said two-dimensional image.

7. The method of claim 1, further comprising:
applying a convex hull technique to at least some of said plurality of inliers.

8. The method of claim 7, wherein said applying said convex hull technique comprises:
generating an area that approximates said elliptically-shaped area that encompasses at least some of said plurality of inliers distributed in said two-dimensional image.

9. The method of claim 1, wherein said at least some of said plurality of inliers represent keypoints having individual reprojection errors of 5-15 pixels.

10. The method of claim 1, further comprising:
extracting keypoints from said information states pertaining to said two-dimensional image.

11. An apparatus comprising:
means for accessing, from a video frame stored in a memory, a two-dimensional image indicative of a three-dimensional object;
means for detecting homography between a reference object image and said two-dimensional image indicative of said three-dimensional object;
means for determining whether said homography indicates pose suitable for image augmentation based, at least in part, on a ratio of a first span to a second span of an elliptically-shaped area that encompasses at least some of a plurality of inliers distributed in said two-dimensional image;
means for tracking said two-dimensional image, from said video frame, in one or more successive video frames responsive to determining that said homography indicates pose suitable for image augmentation; and
means for inserting said reference object image into at least one of said one or more successive video frames.

12. The apparatus of claim 11, wherein said elliptically-shaped area is to encompass at least 20% of a length of said two-dimensional image.

13. The apparatus of claim 11, further comprising:
means for computing at least one eigenvalue of a matrix that corresponds to a moment of rotational inertia of point masses about an axis of said area encompassing said at least some of said plurality of inliers within said area.

14. The apparatus of claim 11, further comprising:
means for applying a convex hull technique to said at least some of said plurality of inliers within said area.

15. The apparatus of claim 11, further comprising:
means for comparing keypoints extracted from said two-dimensional image with key points of said reference object image.

16. An article comprising:
a non-transitory storage medium comprising machine-readable instructions stored thereon which are executable by a processor of a mobile device to:
access, from a video frame stored in a memory, a two-dimensional image of a three-dimensional object;
detect homography between said image of said three-dimensional object representative of said two-dimensional image and a reference object image; and
determine whether said homography indicates pose suitable for image augmentation based, at least in part, on a ratio of a first span to a second span of an elliptically-shaped area that encompasses at least some of a plurality of inliers distributed in said two-dimensional image; and
responsive to determining that said homography indicates pose suitable for image augmentation:
track said two-dimensional image, from said video frame, in one or more successive video frames; and
insert said reference object image into said one or more successive video frames.

17. The article of claim 16, wherein said non-transitory storage medium further comprises machine-readable instructions stored thereon which are executable by a processor to:
model said at least some of said plurality of inliers as point masses that contribute to a moment of rotational inertia about an axis.

18. The article of claim 17, wherein said non-transitory storage medium further comprises machine-readable instructions stored thereon which are executable by processor to:

compute at least one eigenvalue of a matrix that corresponds to said moment of rotational inertia of said point masses.

19. The article of claim 18, wherein said non-transitory storage medium further comprises machine-readable instructions stored thereon which are executable by processor:
compute an eigenvector from said at least one eigenvalue, said eigenvector determining said first span of said elliptically-shaped area that includes said at least some of said plurality of inliers.

20. The article of claim 19, wherein said non-transitory storage medium further comprises machine-readable instructions stored thereon which are executable by processor to:
apply a convex hull technique to said at least some of said plurality of inliers.

21. The article of claim 16, wherein said non-transitory storage medium further comprises machine-readable instructions stored thereon which are executable by processor to:
extract keypoints from said two-dimensional image.

22. A mobile device comprising:
one or more sensors for evaluating homography of an image of a three-dimensional object captured by said mobile device: and
one or more processors to:
detect homography between said image of said three-dimensional object captured in said two-dimensional image, from a video frame stored in a memory, and a reference object image;
determine whether said homography indicates pose suitable for image augmentation based, at least in part, on a ratio of a first span to a second span of an elliptically-shaped area that encompasses at least some of a plurality of inliers distributed in said two-dimensional image; and
responsive to determining that said homography indicates pose suitable for image augmentation:
track said two-dimensional image, from said video frame, in one or more successive video frames; and
insert said reference object image into said one or more successive video frames.

23. The mobile device of claim 22, wherein said one or more processors further models at least some of said plurality of inliers as point masses that contribute to a moment of rotational inertia about an axis.

24. The mobile device of claim 23, wherein said one or more processors further computes at least one eigenvalue of a matrix that corresponds to said moment of rotational inertia about said axis.

25. The mobile device of claim 24, wherein said one or more processors further computes an eigenvector from said at least one eigenvalue, said eigenvector determining said first span of said elliptically-shaped area that encompasses said at least some of said plurality of inliers.

* * * * *